United States Patent
Takeuchi et al.

(10) Patent No.: US 12,338,891 B2
(45) Date of Patent: Jun. 24, 2025

(54) CONTROL DEVICE FOR VEHICLE

(71) Applicant: HONDA MOTOR CO., LTD., Tokyo (JP)

(72) Inventors: Daisuke Takeuchi, Tokyo (JP); Takuya Honjo, Tokyo (JP); Yuki Kosugiyama, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 18/236,140

(22) Filed: Aug. 21, 2023

(65) Prior Publication Data

US 2024/0093781 A1    Mar. 21, 2024

(30) Foreign Application Priority Data

Sep. 16, 2022    (JP) .................................. 2022-147980

(51) Int. Cl.
*F16H 63/34*    (2006.01)
*F16H 59/50*    (2006.01)

(52) U.S. Cl.
CPC ......... *F16H 63/3466* (2013.01); *F16H 59/50* (2013.01)

(58) Field of Classification Search
CPC .......... F02B 37/04; F02B 39/00; F02B 39/10; F02B 4/00; H02K 1/243; H02K 7/1815; H02K 11/215; H02K 16/02; B02P 5/74; B60L 53/20; B60L 50/10; B60K 6/26; B60K 6/28; B60K 17/354; B60K 17/36;

(Continued)

(56) References Cited

U.S. PATENT DOCUMENTS 8,591,361 B2 * 11/2013 Hisada .................. B60K 6/445
                                                                180/65.265
9,876,365 B2 *  1/2018 Mazaki ................... H02M 3/01
                                    (Continued)

FOREIGN PATENT DOCUMENTS

JP    2009-120138 A    6/2009
JP    2017-001629 A    1/2017

(Continued)

OTHER PUBLICATIONS

Jan. 23, 2024, Translation of Japanese Office Action issued for related JP Application No. 2022-147980.

*Primary Examiner* — Andrew Joseph Rudy
(74) *Attorney, Agent, or Firm* — Paratus Law Group, PLLC

(57) ABSTRACT

A control device for a vehicle, the vehicle including: a battery; a first rotary electric machine coupled to an axle; a second rotary electric machine coupled to an internal combustion engine; a first power conversion circuit; a second power conversion circuit; a capacitor connected between the battery and connection portions connecting the first power conversion circuit and the second power conversion circuit in parallel; and a switching unit connected between the battery and the capacitor, the control device executing discharge control when a collision of the vehicle is predicted, and the discharge control includes: opening the switching unit to interrupt the power supply from the battery; stopping rotation of the first rotary electric machine if the first rotary electric machine is rotating; and discharging the electric charge stored in the capacitor.

5 Claims, 8 Drawing Sheets

(58) Field of Classification Search
CPC ..... B60K 2001/001; B60K 1/02; H02M 1/14;
H05K 7/20854; B60W 10/06; B60W
10/08; B60W 10/30; B60W 20/10; B60Y
2200/92; B60Y 2300/60; B60Y 2400/11;
B60Y 2400/112; B60Y 2400/20; B60Y
2400/60; B60Y 2400/302; B60Y
2400/303; B60Y 2400/306; B60Y
2400/435; B62F 61/10; H02P 7/343;
Y02T 10/62; Y02T 10/70; Y02T 10/7072;
Y02T 90/14; F16H 63/34; F16H 63/3466;
F16H 59/50
USPC .............................. 701/22; 361/704; 318/724
See application file for complete search history.

(56) References Cited

U.S. PATENT DOCUMENTS

| | | | | |
|---|---|---|---|---|
| 10,811,989 B2 * | 10/2020 | Suzuki | ................ | H02M 7/003 |
| 11,271,500 B2 * | 3/2022 | Wakabayashi | .......... | B60L 50/16 |
| 12,155,277 B2 * | 11/2024 | Kobayashi | ............. | H02K 5/225 |
| 2020/0358383 A1 | 11/2020 | Wakabayashi | | |

FOREIGN PATENT DOCUMENTS

| | | | |
|---|---|---|---|
| JP | 2020-184864 A | 11/2020 |
| JP | 6928145 B1 | 9/2021 |
| JP | 2022-065377 A | 4/2022 |

* cited by examiner

CONTROL DEVICE FOR VEHICLE

CROSS REFERENCE TO RELATED APPLICATIONS

This application claims priority to Japanese Patent Application No. 2022-147980 filed on Sep. 16, 2022, the content of which is incorporated herein by reference.

TECHNICAL FIELD

The present invention relates to a control device for a vehicle.

BACKGROUND ART

In recent years, active efforts have been made to provide access to a sustainable transportation system in consideration of vulnerable people such as the elderly and children among traffic participants. In order to implement the above, focus has been placed on research and development on further improving safety and convenience of traffic by development related to collision safety performance. In a technique related to collision safety performance, it is important how to ensure electrical safety at a time of a collision of an electric vehicle provided with a drive system such as a battery, a motor, and a power control unit.

JP2009-120138A describes that at a stage when occurrence of a collision of a host vehicle is predicted, an operation to detect whether overcurrent is flowing in a power supply circuit is activated, and if it is detected that the overcurrent is flowing, the power supply circuit is immediately interrupted. JP6928145B describes that if it is determined that a collision of a host vehicle occurs, an electric charge in a capacitor is discharged to make a capacitor voltage lower than a previous capacitor voltage.

Incidentally, when a motor rotates after a collision of a vehicle, a voltage of the motor may become high due to a counter electromotive force generated in the motor. In addition to interrupting the power supply circuit and discharging the capacitor as described in JP2009-120138A and JP6928145B, it is required to take appropriate measures for the motor to ensure electrical safety.

An object of the present invention is to provides a control device for a vehicle capable of ensuring electrical safety at a time of a collision. By extension, the present invention contributes to development of a sustainable transportation system.

SUMMARY OF INVENTION

According to an aspect of the present invention, there is provided a control device for a vehicle, in which the vehicle includes: an internal combustion engine; a battery; a first rotary electric machine coupled to an axle; a second rotary electric machine coupled to the internal combustion engine; a first power conversion circuit configured to convert power between the battery and the first rotary electric machine; a second power conversion circuit configured to convert power between the battery and the second rotary electric machine and connected in parallel with the first power conversion circuit at connection portions; a capacitor connected between the battery and the connection portions to store an electric charge; and a switching unit connected between the battery and the capacitor and configured to interrupt power supply from the battery. The control device is configured to execute discharge control when a collision of the vehicle is predicted, and the discharge control includes: opening the switching unit to interrupt the power supply from the battery; stopping rotation of the first rotary electric machine if the first rotary electric machine is rotating; and discharging the electric charge stored in the capacitor.

DESCRIPTION OF EMBODIMENTS

First Embodiment

Figure 1:
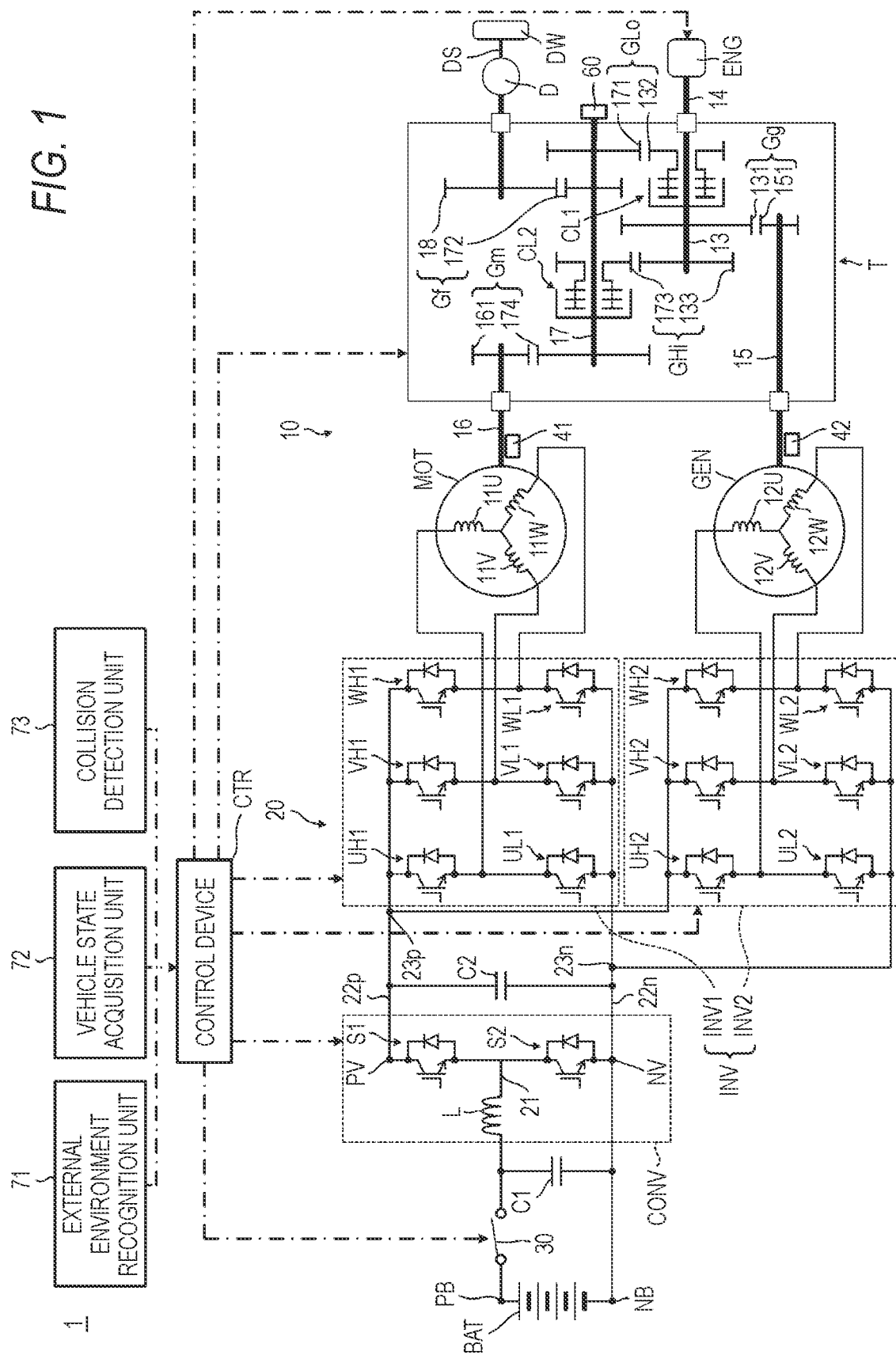
FIG. 1 is a diagram showing a schematic configuration of a vehicle 1 equipped with a control device CTR according to each embodiment of the present invention.

Hereinafter, a first embodiment of a control device for a vehicle according to the present invention will be described below with reference to FIGS. 1 to 7.

[Vehicle]

First, an electric vehicle 1 (hereinafter, simply referred to as the vehicle 1) equipped with a control device according to the first embodiment of the present invention will be described with reference to FIG. 1. A dashed-dotted line in FIG. 1 indicates a control signal line.

The vehicle 1 is a hybrid vehicle including a drive unit 10 including an engine ENG, a motor MOT, and a generator GEN. The vehicle 1 includes a battery BAT, the drive unit 10, a power control unit (hereinafter, sometimes referred to as PCU) 20, an external environment recognition unit 71, a vehicle state acquisition unit 72, a collision detection unit 73, and a control device CTR.

(Battery)

The battery BAT is, for example, a direct current power supply, and transmits and receives power to and from the motor MOT and the generator GEN via the PCU 20. The battery BAT is, for example, a secondary battery such as a lithium ion battery that can be repeatedly charged and discharged. Examples of the secondary battery include a lead-acid battery, a nickel-metal hydride battery, a sodium ion battery, a capacitor such as an electric double layer capacitor, or a composite battery in which a secondary battery and a capacitor are combined. The battery BAT may include, for example, a battery case and a plurality of battery modules accommodated within the battery case. In this case, the battery module includes a plurality of battery cells connected in series. The battery BAT includes a positive terminal PB and a negative terminal NB. The positive terminal PB and the negative terminal NB are connected to positive and negative terminals of the plurality of battery modules connected in series within the battery case.

A switching unit 30 is provided between the battery BAT and the PCU 20. The switching unit 30 is, for example, a relay switch. The switching unit 30 is closed under control of the control device CTR, so that the battery BAT and the PCU 20 are conducted, and power of the battery BAT can be supplied to the PCU 20, the motor MOT, and the generator GEN. The switching unit 30 is opened under the control of the control device CTR to interrupt the battery BAT from the PCU 20. Accordingly, the power from battery BAT cannot be supplied to the PCU 20, the motor MOT, and the generator GEN.

(Drive Unit)

The drive unit 10 further includes a transmission T and a differential mechanism D in addition to including the engine ENG, the motor MOT, and the generator GEN as described above.

The engine ENG is, for example, a diesel engine or a gasoline engine, and functions as a drive source for the vehicle 1.

The motor MOT is coupled to an axle DS, and generates a rotation driving force (power running operation) by the power supplied from at least one of the battery BAT and the generator GEN to rotate a drive wheel DW. That is, the motor MOT functions as the drive source for the vehicle 1 as well as the engine ENG. The motor MOT generates (regenerates) the power by a braking force input to a motor shaft 16.

The motor MOT is, for example, a three-phase (U-phase, V-phase, and W-phase) alternating current brushless DC motor. The motor MOT is, for example, an inner rotor type. For example, the motor MOT includes a rotor having a permanent magnet for a magnetic field, and a stator having coils 11U, 11V, and 11W corresponding to the three phases (U-phase, V-phase, and W-phase) for generating a rotation magnetic field that causes the rotor to rotate. One end of the coil 11U, one end of the coil 11V, and one end of the coil 11W of the phases are connected to each other, and the other ends thereof are connected to a first inverter INV1 which will be described later.

The motor MOT is provided with a first sensor 41 that measures the number of rotations of the motor MOT. For example, the first sensor 41 acquires an electrical angle, which is a rotation angle (a rotation angle in a coordinate system fixed with respect to the stator of the motor MOT) of an outer rotor or the motor shaft 16 which is an output shaft of the motor MOT. The first sensor 41 differentiates the acquired electrical angle to acquire an electrical angular velocity as a detection value of a rotation speed of the motor shaft 16 (=a rotation speed of the outer rotor), and measures the number of rotations of the motor MOT based on the acquired electrical angular velocity. The first sensor 41 measures the number of rotations of the motor MOT at a predetermined cycle and outputs information related to the measured number of rotations to the control device CTR.

The generator GEN is coupled to the engine ENG and driven by a rotation power of the engine ENG to generate regenerative power. Similar to the motor MOT, the generator GEN is, for example, a three-phase (U-phase, V-phase, and W-phase) alternating current brushless DC motor. The generator GEN is, for example, an inner rotor type. For example, the generator GEN includes a rotor having a permanent magnet for a magnetic field, and a stator having coils 12U, 12V, and 12W corresponding to the three phases (U-phase, V-phase, and W-phase) for generating a rotation magnetic field that causes the rotor to rotate. One end of the coil 12U, one end of the coil 12V, and one end of the coil 12W of the phases are connected to each other, and the other ends thereof are connected to a second inverter INV2 which will be described later.

The generator GEN is provided with a second sensor 42 that measures the number of rotations of the generator GEN. For example, the second sensor 42 acquires an electrical angle, which is a rotation angle (rotation angle in a coordinate system fixed with respect to the stator of the generator GEN) of an outer rotor or a generator shaft 15 which is an output shaft of the generator GEN. The second sensor 42 differentiates the acquired electrical angle to acquire an electrical angular velocity as a detection value of a rotation speed of the generator shaft 15, and measures the number of rotations of the generator GEN based on the acquired electrical angular velocity. The second sensor 42 measures the number of rotations of the generator GEN at a predetermined cycle and outputs information related to the measured number of rotations to the control device CTR.

An alternating current voltage output from an inverter INV which will be described later is applied to the motor MOT and the generator GEN. Accordingly, the motor MOT and the generator GEN rotate, and an energy (driving force) obtained by the rotation is supplied to the axle DS and the engine ENG. The motor MOT and the generator GEN generate (regenerate) power by rotation, and supply the generated power to a second capacitor C2 which will be described later via the inverter INV.

The transmission T includes, for example, an engine shaft 13, the generator shaft 15, the motor shaft 16, a counter shaft 17, a high-speed side engine gear train GHi, a low-speed side engine gear train GLo, a generator gear train Gg, a motor gear train Gm, a final gear train Gf, a first clutch CL1, and a second clutch CL2. The transmission T is configured to transmit power among the motor MOT, the generator GEN, the engine ENG, and the differential mechanism D.

The engine shaft 13 is coaxially arranged side by side with a crankshaft 14 of the engine ENG. A driving force of the crankshaft 14 is transmitted to the engine shaft 13 via a damper (not shown). A generator drive gear 131 is provided on the engine shaft 13.

In the engine shaft 13, with respect to the generator drive gear 131, a low-speed side drive gear 132 is provided on an engine side via the first clutch CL1, and a high-speed side drive gear 133 is provided on a side opposite to the engine side. The first clutch CL1 is a hydraulic lockup clutch for detachably coupling the engine shaft 13 and the low-speed side drive gear 132.

The generator shaft 15 is connected to the rotor (not shown) of the generator GEN. A generator driven gear 151 that meshes with the generator drive gear 131 is provided on the generator shaft 15. The generator drive gear 131 and the generator driven gear 151 constitute the generator gear train Gg for transmitting the rotation of the engine shaft 13 to the generator shaft 15.

The rotation of the engine shaft 13 is transmitted to the generator shaft 15 via the generator gear train Gg, thereby the rotation of the generator shaft 15 causes the generator GEN to rotate. Accordingly, when the engine ENG is driven, a driving force of the engine ENG transmitted from the engine shaft 13 can always be converted into the power by the generator GEN.

The motor shaft 16 is connected to the rotor (not shown) of the motor MOT. A motor drive gear 161 is provided on the motor shaft 16.

The counter shaft 17 is provided with, in order from the engine side, a low-speed side driven gear 171 that meshes with the low-speed side drive gear 132, an output gear 172 that meshes with a ring gear 18 of the differential mechanism D, a high-speed side driven gear 173 that meshes with the high-speed side drive gear 133 of the engine shaft 13 via the second clutch CL2, and a motor driven gear 174 that meshes with the motor drive gear 161 of the motor shaft 16. The second clutch CL2 is a hydraulic lockup clutch for detachably coupling the counter shaft 17 and the high-speed side driven gear 173.

The low-speed side drive gear 132 and the low-speed side driven gear 171 constitute the low-speed side engine gear train GLo for transmitting the rotation of the engine shaft 13 to the counter shaft 17. The high-speed side drive gear 133 and the high-speed side driven gear 173 constitute the high-speed side engine gear train GHi for transmitting the rotation of the engine shaft 13 to the counter shaft 17. Here, the low-speed side engine gear train GLo has a larger reduction ratio than the high-speed side engine gear train GHi. Therefore, by engaging the first clutch CL1 and releasing the second clutch CL2 when the engine ENG is driven, the driving force of the engine ENG is transmitted to the counter shaft 17 at a large reduction ratio via the low-speed side engine gear train GLo. On the other hand, by releasing the first clutch CL1 and engaging the second clutch CL2 when the engine ENG is driven, the driving force of the engine ENG is transmitted to the counter shaft 17 at a small reduction ratio via the high-speed side engine gear train GHi. The first clutch CL1 and the second clutch CL2 are not engaged at the same time.

The motor drive gear 161 and the motor driven gear 174 constitute the motor gear train Gm for transmitting rotation of the motor shaft 16 to the counter shaft 17. When the motor MOT rotates, the rotation of the motor shaft 16 is transmitted to the counter shaft 17 via the motor gear train Gm. Accordingly, when the motor MOT drives, the driving force of the motor MOT is transmitted to the counter shaft 17 via the motor gear train Gm.

The output gear 172 and the ring gear 18 constitute the final gear train Gf for transmitting rotation of the counter shaft 17 to the differential mechanism D. Therefore, the driving force of the motor MOT input to the counter shaft 17 via the motor gear train Gm, the driving force of the engine ENG input to the counter shaft 17 via the low-speed side engine gear train GLo, and the driving force of the engine ENG input to the counter shaft 17 via the high-speed side engine gear train GHi are transmitted to the differential mechanism D via the final gear train Gf, and are transmitted from the differential mechanism D to the axle DS.

The vehicle 1 is provided with a parking mechanism 60 capable of locking rotation of the axle DS. When a driver operates a shift lever to shift to P (parking), an actuator of the parking mechanism 60 is driven, and the parking mechanism 60 locks the rotation of the axle DS. In the present embodiment, the parking mechanism 60 is configured to lock the rotation of the counter shaft 17, and by locking the rotation of the counter shaft 17, the rotation of the axle DS is also locked. Accordingly, the rotation of the motor shaft 16 which is coupled to the counter shaft 17 via the motor gear train Gm is also prohibited.

(Power Control Unit (PCU))

The PCU 20 includes a first capacitor C1, the second capacitor C2, a converter CONV, and the inverter INV. The inverter INV includes the first inverter INV1 and the second inverter INV2.

The first capacitor C1 is connected between the battery BAT and the converter CONV and smoothes a voltage fluctuation between the battery BAT and the converter CONV. The first capacitor C1 stores the power supplied from the battery BAT.

The second capacitor C2 is connected between the converter CONV and the inverter INV, and smoothes a voltage fluctuation between the converter CONV and the inverter INV. The second capacitor C2 stores the power acquired via the inverter INV and generated by the motor MOT or the generator GEN.

The converter CONV is provided between the battery BAT and the inverter INV, and boosts a direct current voltage supplied from the battery BAT by DC-DC conversion under the control of the control device CTR. The converter CONV includes an upper arm element S1 and a lower arm element S2 functioning as switching elements, and a reactor L. In the present embodiment, the converter CONV is implemented by one phase, but may be implemented by two or more phases.

One end of the reactor L is connected to the positive terminal PB of the battery BAT, and the other end is connected to a connection point between the upper arm element S1 and the lower arm element S2 by a bus bar 21. The reactor L includes, for example, a coil and a temperature sensor that detects a temperature of the coil. The temperature sensor may output the temperature of the coil to the control device CTR at a predetermined circle.

An electrode on a positive side of the upper arm element S1 is connected to a positive bus bar PV. The positive bus bar PV is connected to a power line 22p on a positive side of the battery BAT. An electrode on a negative side of the upper arm element S1 is connected to the electrode on a positive side of the lower arm element S2. An electrode on a negative side of the lower arm element S2 is connected to a negative bus bar NV. The negative bus bar NV is connected to a power line 22n on a negative side of the battery BAT.

The upper arm element S1 includes, for example, a transistor as a switching element and a freewheeling diode as a rectifying element connected in parallel with the transistor. The transistor is, for example, an insulated gate bipolar transistor (IGBT). The transistor may be a metal oxide semi-conductor field effect transistor (MOSFET).

During boosting, the converter CONV alternately switches between a first state where a transistor of the lower arm element S2 is set to an ON (conductive) state and the transistor of the upper arm element S1 is set to an OFF (interruption) state and a second state where the transistor of the lower arm element S2 is set to an OFF (interruption) state and the transistor of the upper arm element S1 is set to an ON (conductive) state. In the first state, a current sequentially flows through the positive terminal PB of the battery BAT, the reactor L, the lower arm element S2, and the negative terminal NB of the battery BAT, and the reactor L is direct-current excited to store a magnetic energy. In the second state, an electromotive voltage (induced voltage) is generated between both ends of the reactor L so as to prevent a change in a magnetic flux due to interruption of the current flowing through the reactor L. A voltage induced by the magnetic energy stored in the reactor L is superimposed on a battery voltage, and a boosted voltage higher than a voltage between the terminals of the battery BAT is applied between the positive bus bar PV and the negative bus bar NV.

The converter CONV alternately switches between the second state and the first state during the regeneration. In the second state, a current sequentially flows through the positive bus bar PV, the upper arm element S1, the reactor L, and the positive terminal PB of the battery BAT, and the reactor L is direct-current excited to store the magnetic energy. In the first state, the electromotive voltage (induced voltage) is generated between both ends of the reactor L so as to prevent a change in the magnetic flux due to the interruption of the current flowing through the reactor L. The voltage induced by the magnetic energy stored in the reactor L is stepped down, and the stepped-down voltage lower than a voltage between the positive bus bar PV and the negative bus bar NV is applied between the positive terminal PB and the negative terminal NB of the battery BAT.

The first inverter INV1 and the second inverter INV2 are, for example, pulse width modulation (PWM) inverters each having a bridge circuit configured by bridge-connecting a plurality of switching elements (for example, transistors such as IGBT and MOSFET). The switching elements (transistors) are connected in parallel with a diode as a rectifying element, and the switching elements and the diode form an arm element. The first inverter INV1 converts the power between the battery BAT (more specifically, the converter CONV) and the motor MOT. The second inverter INV2 converts the power between the battery BAT (more specifically, the converter CONV) and the generator GEN. Each of the first inverter INV1 and the second inverter INV2 has, for example, a function of performing conversion between direct current power and alternating current power. The first inverter INV1 is connected to the power line 22p on the positive side and the power line 22n on the negative side on direct current input and output sides of the first inverter INV1, and is connected to the coils 11U, 11V, and 11W of the motor MOT on alternating current input and output sides of the first inverter INV1. The second inverter INV2 is connected to the power line 22p on the positive side and the power line 22n on the negative side on direct current input and output sides of the second inverter INV2, and is connected to the coils 12U, 12V, and 12W of the generator GEN on alternating current input and output sides of the second inverter INV2.

The first inverter INV1 is configured by bridge-connecting, for each phrase in the motor MOT, a U-phase upper arm element (high-side U-phase switching element) UH1 and a U-phase lower arm element (low-side U-phase switching element) UL1 connected to the U-phase, a V-phase upper arm element (high-side V-phase switching element) VH1 and a V-phase lower arm element (low-side V-phase switching element) VL1 connected to the V-phase, and a W-phase upper arm element (high-side W-phase switching element) WH1 and a W-phase lower arm element (low-side W-phase switching element) WL1 connected to the W-phase. One end of each phase upper arm element UH1, VH1, WH1 is connected to the power line 22p, and one end of each phase lower arm element UL1, VL1, WL1 is connected to the power line 22n.

The first inverter INV1 turns on or off the switching element of each phase based on a drive signal generated at a predetermined timing from the control device CTR, so that the direct current power supplied from the converter CONV is converted into the alternating current power and supplied to the motor MOT The first inverter INV1 may detect a current value for power to be output and output the detected current value to the control device CTR. The first inverter INV1 converts the alternating current power supplied from the motor MOT into the direct current power and supplies the direct current power to the converter CONV and the second capacitor C2.

The second inverter INV2 is configured by bridge-connecting, for each phrase in the generator GEN, a U-phase upper arm element UH2 and a U-phase lower arm element UL2 connected to the U-phase, a V-phase upper arm element VH2 and a V-phase lower arm element VL2 connected to the V-phase, and a W-phase upper arm element WH2 and a W-phase lower arm element WL2 connected to the W-phase. One end (direct current input and output side) of each phase upper arm element UH2, VH2, WH2 is connected to the power line 22p and a connection portion 23p, and one end (direct current input and output side) of each phase lower arm element UL2, VL2, WL2 is connected to the power line 22n and a connection portion 23n. Thus, the second inverter INV2 is connected in parallel to the first inverter INV1 at the connection portions 23p and 23n.

The second inverter INV2 turns on or off the switching element of each phase based on a drive signal generated at a predetermined timing from the control device CTR, so that the direct current power supplied from the converter CONV is converted into the alternating current power and supplied to the generator GEN. The second inverter INV2 may detect a current value for power to be output and output the detected current value to the control device CTR. The second inverter INV2 converts the alternating current power supplied from the generator GEN into the direct current power and supplies the direct current power to the converter CONV.

(External Environment Recognition Unit)

The external environment recognition unit 71 includes, for example, a camera, a radar device, and laser imaging detection and ranging (LIDAR). The external environment recognition unit 71 acquires information (hereinafter, also referred to as peripheral information) on an object (including an other vehicle) around the vehicle 1 and outputs the information to the control device CTR. The external environment recognition unit 71 may detect a distance to the object around the vehicle 1, a speed of the object, a relative speed, and the like from the peripheral information, and output a detection result to the control device CTR. The information acquired from the external environment recognition unit 71 is used, for example, for predicting a collision possibility of the vehicle 1.

(Vehicle State Acquisition Unit)

The vehicle state acquisition unit 72 includes, for example, various sensors such as a vehicle speed sensor, an acceleration sensor, an accelerator position sensor, a steering angle sensor, and a brake sensor. The vehicle state acquisition unit 72 acquires information related to a traveling state of the vehicle 1 (a stopped state at the time of stopping), and outputs the information to the control device CTR. The information acquired from the vehicle state acquisition unit 72 is used, for example, for predicting the collision possibility of the vehicle 1.

(Collision Detection Unit)

The collision detection unit 73 is, for example, a supplemental restraint system (SRS) sensor. The SRS sensor is a sensor that constitutes an SRS airbag device, and is an acceleration sensor that detects a collision (front collision, side collision, rear collision). The collision detection unit 73 transmits a collision signal to the control device CTR if the collision detection unit 73 detects that a collision occurs.

(Control Device)

The control device CTR controls an operation of each component in the vehicle 1. The control device CTR is, for example, a software function unit that functions when a predetermined program is executed by a processor such as a central processing unit (CPU). The software function unit is an electronic control unit (ECU) including a processor such as a CPU, a read only memory (ROM) that stores programs, a random access memory (RAM) that temporarily stores data, and an electronic circuit such as a timer. At least part of the control device CTR may be an integrated circuit such as large scale integration (LSI).

Figure 2:
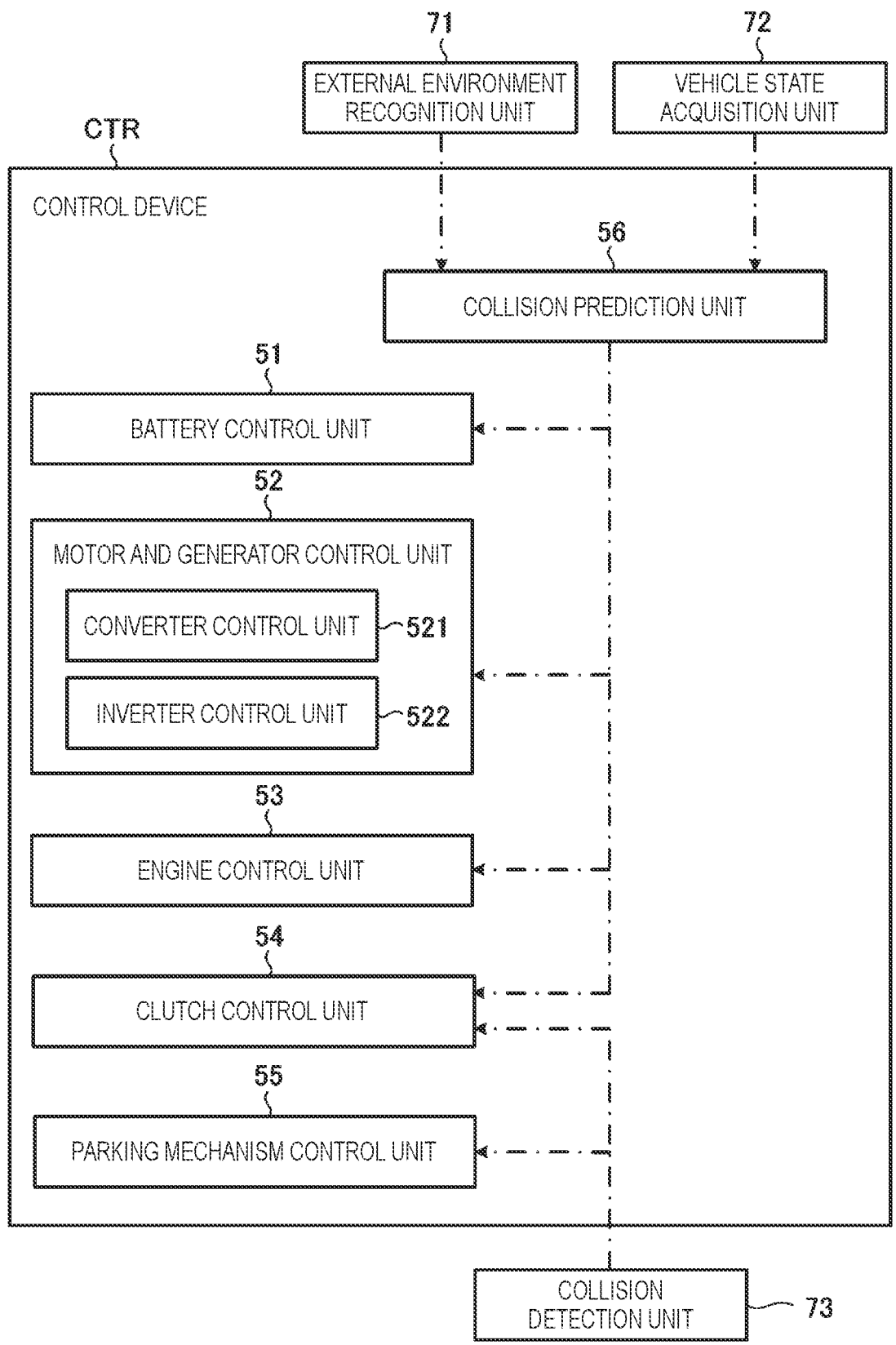
FIG. 2 is a diagram showing a configuration of the control device CTR.

As shown in FIG. 2, the control device CTR includes, for example, a battery control unit 51, a motor and generator control unit 52, an engine control unit 53, a clutch control unit 54, a parking mechanism control unit 55, and a collision prediction unit 56. These do not have to be implemented by one control device, and may be implemented by separate control devices. For example, the motor and generator control unit 52 may be implemented by a control device included in the PCU 20, and other configurations may be implemented by a control device separate from the PCU 20. A dashed-dotted line in FIG. 2 indicates a control signal line.

The battery control unit 51 monitors a state of the battery BAT and controls opening and closing of the switching unit 30. The battery control unit 51 includes a battery sensor unit (not shown). The battery sensor unit includes a plurality of sensors necessary for estimating an internal state of the battery BAT, such as voltage, current, and temperature of the battery BAT.

The motor and generator control unit 52 provides a gate drive signal (that is, control signal) to the converter CONV and the inverter INV to control the motor MOT and the generator GEN. The motor and generator control unit 52 includes a converter control unit 521 and an inverter control unit 522.

The converter control unit 521 boosts the direct current voltage input from the battery BAT to the converter CONV to a predetermined voltage by switching operations of the switching elements, that is, the upper arm element S1 and the lower arm element S2 included in the converter CONV.

The inverter control unit 522 generates a gate drive signal for controlling the switching operations of the switching elements of the phases of the first inverter INV1 and the second inverter INV2, and outputs the generated gate drive signal to the first inverter INV1 and the second inverter INV2. Accordingly, the first inverter INV1 and the second inverter INV2 perform DC-AC conversion according to the gate drive signal from the inverter control unit 522. For example, the converter control unit 521 and the inverter control unit 522 execute control for causing the converter CONV and the inverter INV to generate power for causing the motor MOT and the generator GEN to rotate at a predetermined torque.

The engine control unit 53 executes, for example, control related to adjustment of a throttle opening degree of the engine ENG and fuel supply. Details will be described later, and when a collision of the vehicle 1 is predicted, the engine control unit 53 stops the supply of fuel (so-called fuel cut) to stop the engine ENG.

The clutch control unit 54 controls the first clutch CL1 and the second clutch CL2. Specifically, the clutch control unit 54 releases the first clutch CL1 and the second clutch CL2, releases the first clutch CL1 and engages the second clutch CL2, or engages the first clutch CL1 and releases the second clutch CL2.

The parking mechanism control unit 55 controls the parking mechanism 60. Specifically, the parking mechanism control unit 55 drives the actuator of the parking mechanism 60 under a predetermined condition to lock the rotation of the axle DS.

Figure 3:
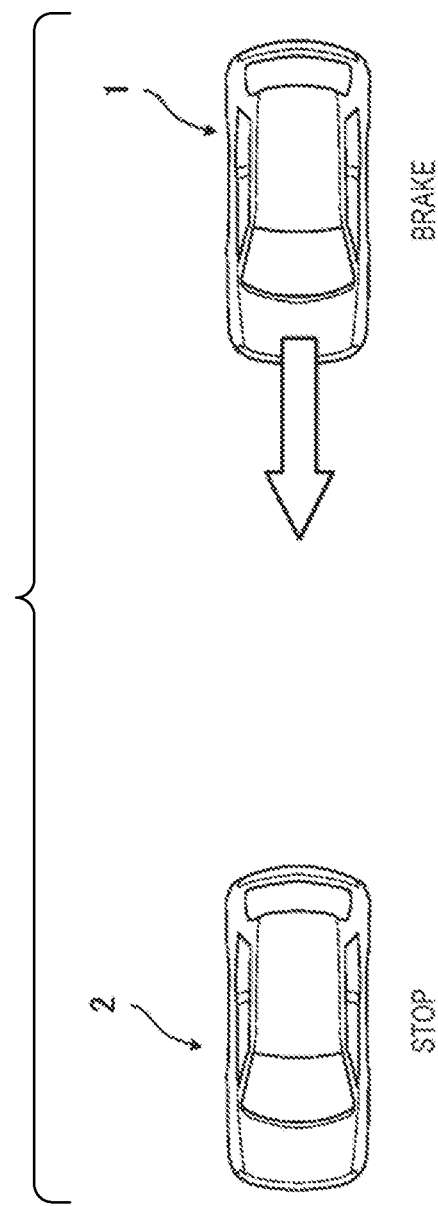
FIG. 3 is a diagram showing an example of a scene in which discharge control can be performed.

The collision prediction unit 56 predicts whether there is a possibility of a collision between the vehicle 1 which is a host vehicle (hereinafter, also referred to as the host vehicle 1) and an object in the periphery. The collision prediction unit 56 predicts a collision of the vehicle 1 based on the information acquired by the external environment recognition unit 71 and/or the vehicle state acquisition unit 72. For example, as shown in FIG. 3, in a case where an other vehicle 2 (also referred to as the other vehicle 2) stops in front of a travel path of the host vehicle 1, when the driver applies a brake to decelerate the host vehicle 1 in order to avoid a collision with the other vehicle 2, the collision prediction unit 56 predicts that there is a possibility of a collision. The brake operation is not limited to that performed by the driver, and may be determined by the control device CTR and automatically cause the brake to operate.

If the collision prediction unit 56 predicts that there is a possibility of a collision of the vehicle 1, the control device CTR executes discharge control, which will be described below, before the collision.

[Control Before Collision]

Details of the discharge control executed before the collision of the vehicle 1 will be described. In the present embodiment, as shown in FIG. 3, it is assumed that the host vehicle 1 decelerates before the collision and tries to avoid the collision by decelerating.

The discharge control has a battery interruption step, an engine stop step, a motor rotation stop step, and a capacitor discharge step. The control device CTR (specifically, the battery control unit 51, the motor and generator control unit 52, and the engine control unit 53) executes the discharge control when the collision of the vehicle 1 is predicted.

The battery interruption step is a step of opening the switching unit 30 to interrupt power supply from the battery BAT. Specifically, the battery control unit 51 switches the switching unit 30 to the open state to interrupt the power supply from the battery BAT to the PCU 20, the motor MOT, and the generator GEN. When the interruption of the battery BAT is not completed at the time of the collision, an electrical short circuit occurs in wiring components connected to the battery BAT, and an excessive short-circuit current is supplied from the battery BAT, which may cause smoke or fire. In the present embodiment, the control device CTR executes the battery interruption step at the stage when the collision is predicted, and thus, it is possible to prevent an excessive short-circuit current from being supplied from the battery BAT after the collision.

The engine stop step is a step of stopping the engine ENG when the engine ENG is being driven. The engine control unit 53 performs the fuel cut to stop the engine ENG. The engine ENG is stopped, so that power generation in the generator GEN is stopped. The engine stop step is omitted when the engine ENG is stopping.

The motor rotation stop step is a step of stopping the rotation of the motor MOT when the motor MOT is rotating. If the motor MOT rotates after the collision of the vehicle 1, a counter electromotive force is generated in the motor MOT, so that the voltage of the motor MOT may become high. Therefore, the motor and generator control unit 52 executes the motor rotation stop step at the stage when the collision is predicted. Accordingly, it is possible to prevent that the motor MOT rotates after the collision and the voltage thereof becomes high due to the counter electromotive force, thereby ensuring the electrical safety. Since the electrical safety can be ensured against an increase in the voltage of the motor MOT, there is no need to separately perform a process on the motor MOT to strengthen the insulation of the motor MOT, for example. If the motor MOT is not rotating when the discharge control is executed, the motor and generator control unit 52 keeps the rotation of the motor MOT stopped.

Here, "stopping the rotation of the motor MOT" in the motor rotation stop step includes a series of processes from a time when the rotation of the motor MOT starts to be suppressed (that is, a rotation speed is reduced) to a time when the motor MOT actually stops. The term "stop" includes not only setting the rotation speed of the motor MOT to exactly zero, but also setting the rotation speed to a threshold slightly larger than zero.

In the motor rotation stop step, when the motor MOT is rotating, the motor and generator control unit 52 suppresses the rotation of the motor MOT by executing power generation control due to the rotation of the motor MOT, and stops the rotation of the motor MOT. The power generation control refers to control for generating regenerative power in the motor MOT as the vehicle 1 decelerates. Whether the motor MOT is rotating may be determined based on the number of rotations of the motor MOT measured by the first sensor 41, or may be determined based on a value of a current sensor (not shown) that measures current flowing through the motor MOT.

To describe the power generation control in the motor MOT in more detail, the motor and generator control unit 52 executes three-phase short-circuit control for turning off the three-phase upper arm elements UH1, VH1, and WH1 of the first inverter INV1 and turning on the three-phase lower arm elements UL1, VL1, and WL1. In this case, as indicated by white arrows in FIG. 4, the current is commutated between the three-phase lower arm elements UL1, VL1, WL1 and the motor MOT, and thus, a braking torque that decelerates the rotation is generated in the motor MOT. By executing the power generation control in this manner, the motor MOT can be stopped more quickly than a case where the rotation of the motor MOT is stopped only by friction. This example is just an example, and when executing the power generation control in the motor MOT, a closed circuit may be configured between the motor MOT and the first inverter INV1.

By causing the motor MOT to consume the power generated by the motor MOT in this way, the voltage of the motor MOT can be lowered before the collision, and the electrical safety can be ensured. In the prior art, the power generated by the rotation of the motor is consumed by the coils of the motor after the collision of the vehicle, thereby reducing the voltage of the motor, and thus, it is necessary to physically protect the motor with a protective member such as a skid plate so that the motor can be used even after the collision. In the present embodiment, the voltage of the motor MOT is reduced at the stage when the collision is predicted, and thus, there is no need to provide such a protective member, and manufacturing costs can be reduced.

Figure 4:
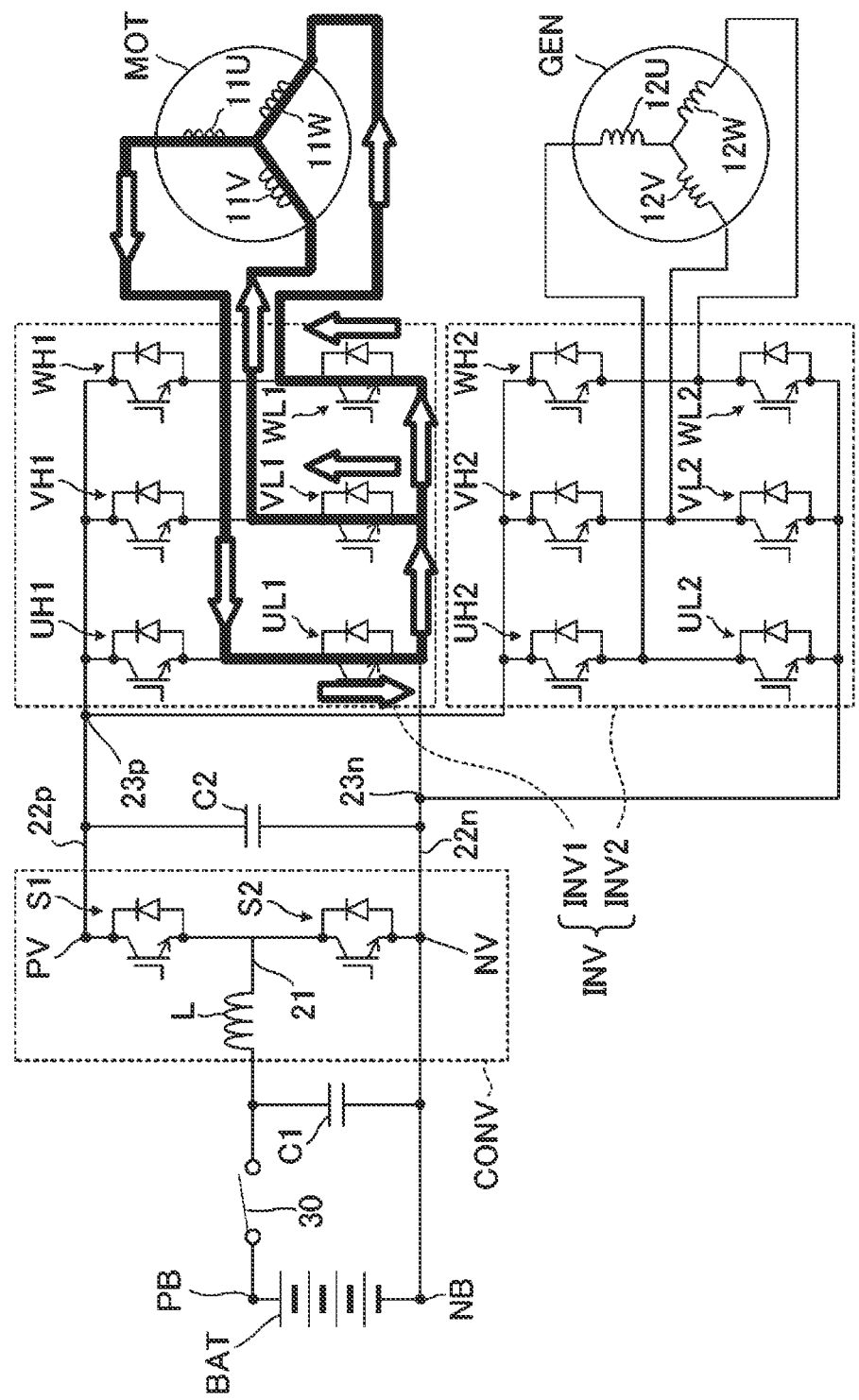
FIG. 4 is a diagram showing a current flow during execution of a motor rotation stop step.

In the power generation control in the motor MOT, it is not necessary to generate the commutation of the current as shown in FIG. 4. For example, the motor and generator control unit 52 may control the first inverter INV1 to store the power generated by the rotation of the motor MOT in the capacitor C1 and/or the capacitor C2. An electric charge(s) stored in the capacitor C1 and/or the capacitor C2 is discharged before the collision by the capacitor discharge step described below. Accordingly, the voltage of the motor MOT can be lowered before the collision, and the electrical safety can be ensured.

The capacitor discharge step is a step of discharging the electric charges stored in the first capacitor C1 and the second capacitor C2. Specifically, the motor and generator control unit 52 supplies the electric charges discharged from the first capacitor C1 and the second capacitor C2 to the generator GEN via the second inverter INV2, and causes the generator GEN to consume the electric charges. The capacitor discharge step is executed, for example, after the battery interruption step, the engine stop step, and the motor rotation stop step are executed, but is not limited thereto, and may be executed, for example, during the motor rotation stop step.

Figure 5:
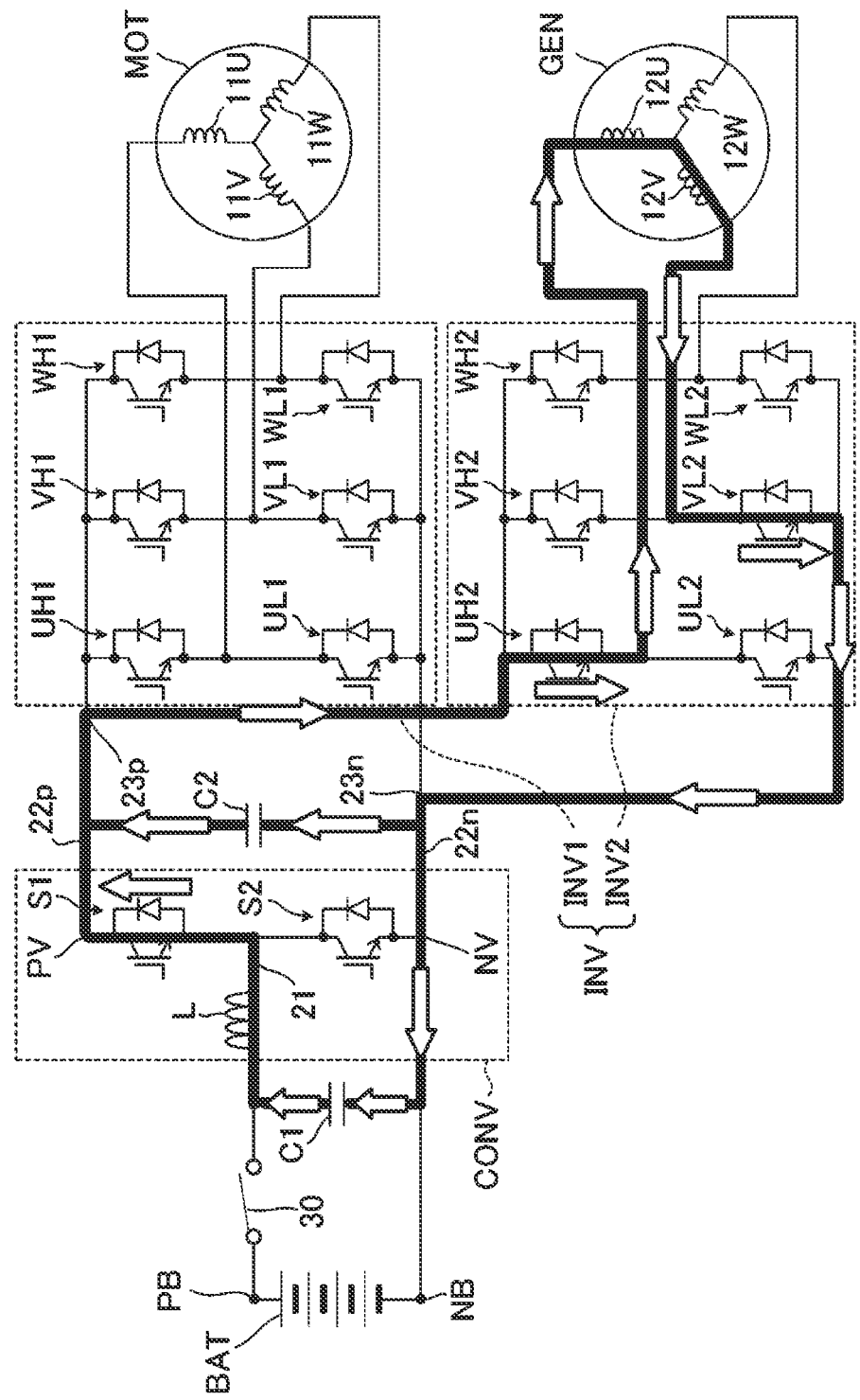
FIG. 5 is a diagram showing an electric charge flow during execution of a capacitor discharge step.

In the capacitor discharge step, for example, the motor and generator control unit 52 turns on only a specific arm element of the second inverter INV2, and does not perform the switching operation of each arm element. For example, as shown in FIG. 5, the motor and generator control unit 52 turns on the U-phase upper arm element UH2 and the V-phase lower arm element VL2 of the second inverter INV2, and turns off the other arm elements of the second inverter INV2. The motor and generator control unit 52 does not perform the switching operation of each arm element from this state. Accordingly, as indicated by white arrows in FIG. 5, the electric charge stored in the second capacitor C2 is supplied to the generator GEN via the second inverter INV2 and consumed by the generator GEN.

By turning on the upper arm element S1 of the converter CONV and turning off the lower arm element S2, the motor and generator control unit 52 also supplies the electric charge stored in the first capacitor C1 to the generator GEN via the second inverter INV2.

According to such a capacitor discharge step, the electric charges stored in the first capacitor C1 and the second capacitor C2 can be consumed by the generator GEN before the collision, and thus, a large number of electric charges is not discharged from the first capacitor C1 and the second capacitor C2 after the collision. Therefore, the electrical safety can be ensured.

[Control Flow]

Figure 6:
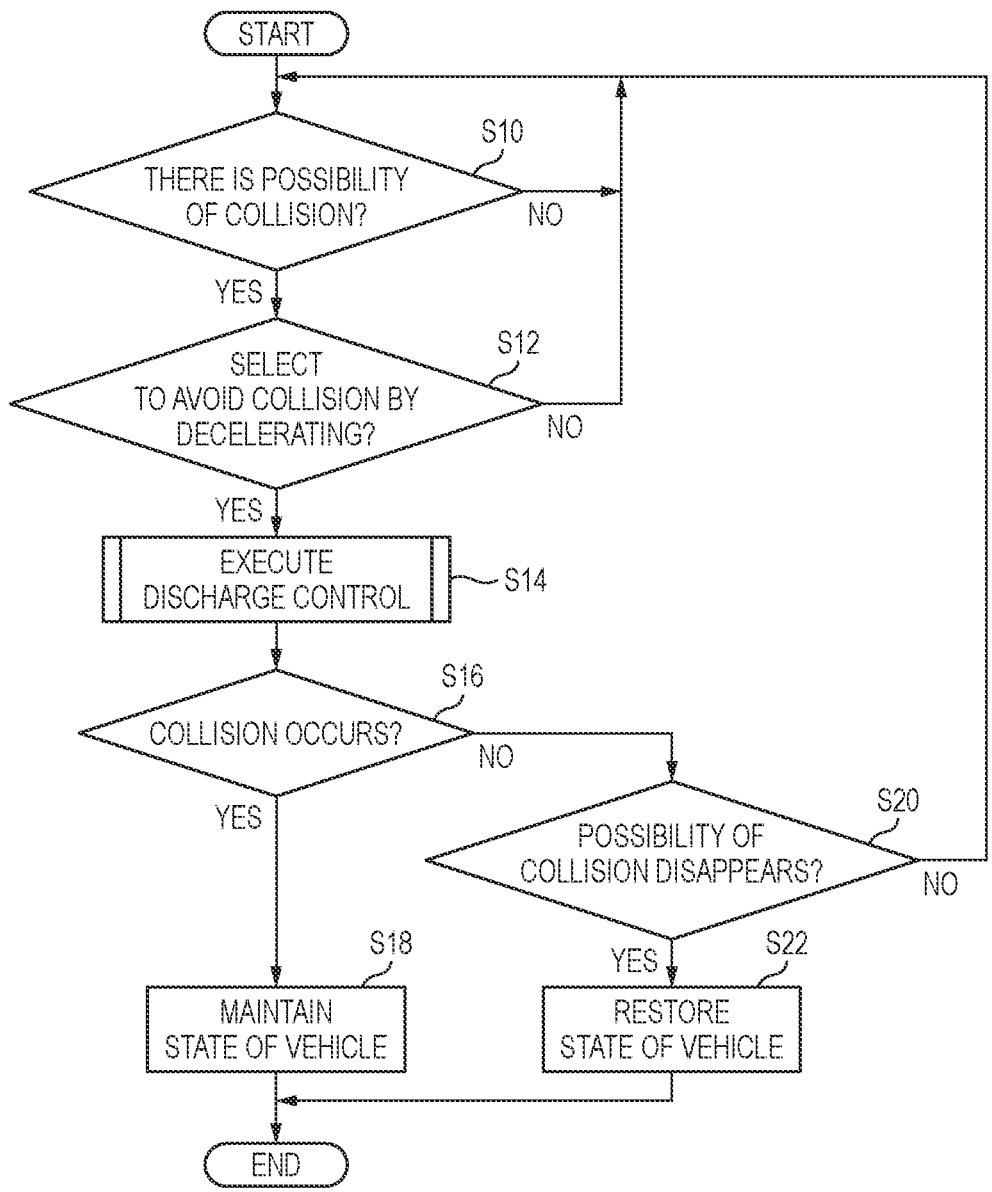
FIG. 6 is a diagram showing an example of a control flow executed by the control device CTR according to a first embodiment when a collision of the vehicle 1 is predicted.

Next, a flow executed when the collision of the vehicle 1 is predicted will be described with reference to FIG. 6.

First, the control device CTR determines whether there is a possibility that the collision of the vehicle 1 occurs (step S10). If there is no possibility that the collision occurs (step S10: NO), the control device CTR monitors step S10 until the possibility of the collision occurs.

If it is determined that there is a possibility that the collision of the vehicle 1 occurs (step S10: YES), the control device CTR determines whether the vehicle 1 selects to avoid the collision by decelerating (step S12). If the vehicle 1 attempts to avoid the collision by decelerating, for example, if the driver performs a brake operation (step S12: YES), the vehicle 1 decelerates to avoid the collision, and the control device CTR executes the discharge control (step S14). On the other hand, if the vehicle 1 attempts to avoid the collision by a method other than the deceleration (step S12: NO), the control device CTR does not execute the discharge control. Here, the method other than the deceleration includes, for example, a method of changing a lane to avoid the collision with the other vehicle 2 (see FIG. 3).

Figure 7:
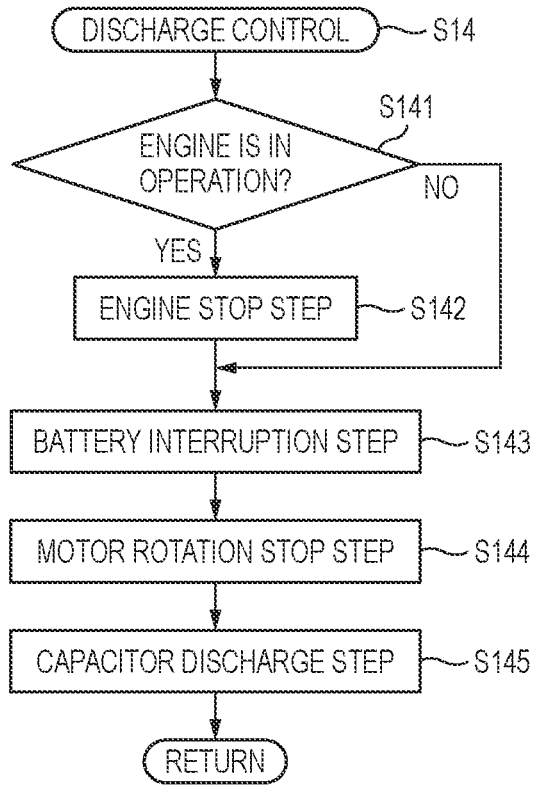
FIG. 7 is a diagram showing a control flow of the discharge control.

The discharge control in step S14 is executed according to a flow shown in FIG. 7. First, the control device CTR determines whether the engine ENG is in operation (step S141). If the engine ENG is in operation (step S141: YES), an engine stop step S142, a battery interruption step S143, and a motor rotation stop step S144 described above are executed. The three steps may be executed in parallel. The control device CTR then executes a capacitor discharge step S145 described above. On the other hand, if the engine ENG is not in operation (step S141: NO), the control device CTR does not execute the engine stop step S142, but executes the battery interruption step S143, the motor rotation stop step S144, and the capacitor discharge step S145.

Returning to FIG. 6, after executing the discharge control, the control device CTR determines whether the collision actually occurs (step S16). Specifically, if the control device CTR receives a collision signal from the collision detection unit 73, the control device CTR determines that the collision occurs (step S16: YES). After the collision occurs, the control device CTR causes a current state of the vehicle 1 to be maintained. That is, the control device CTR continues the interruption of the battery BAT, the stop of the engine ENG, and the stop of the rotation of the motor MOT, which are executed in the discharge control (step S18). Accordingly, the electrical safety can be maintained after the collision. After step S18, the control flow ends.

After the discharge control is executed, if it is determined that the collision does not occur (step S16: NO), the control device CTR determines whether the possibility of the collision disappears (step S20). If the possibility of the collision disappears (step S20: YES), the state of the vehicle 1 is restored, that is, the power supply from the battery BAT, the operation of the engine ENG, and the rotation of the motor MOT are restarted (step S22). In other words, the control device CTR ends the discharge control when the collision of the vehicle is avoided after the execution of the discharge control. Thereby, the vehicle 1 can be restored to the normal traveling state. After step S22, the control flow ends.

If the possibility of the collision does not disappear (step S20: NO), the control device CTR returns to step S10 and repeats the control flow in preparation for another collision.

[Control after Collision]

Next, the control executed after the collision of the vehicle 1 will be described. After the collision of the vehicle 1, it is preferable to mechanically prohibit the rotation of the motor MOT such that the rotation of the motor MOT is reliably stopped and the voltage of the motor MOT does not become high due to the counter electromotive force. In the present embodiment, the control device CTR, more specifically, the parking mechanism control unit 55 or the clutch control unit 54, performs control to prohibit the rotation of the motor MOT.

First, the control performed by the parking mechanism control unit 55 after the collision of the vehicle 1 will be described. When the parking mechanism control unit 55 receives the collision signal transmitted from the collision detection unit 73 and recognizes that the collision of the vehicle 1 occurs, the parking mechanism control unit 55 controls the parking mechanism 60 to lock the rotation of the axle DS, and thus prohibiting the rotation of the motor MOT coupled to the axle DS. That is, the stop state of the motor MOT that is stopped by the motor rotation stop step can be maintained, and thus, it is possible to prevent that the motor MOT rotates and the voltage of the motor MOT becomes high after the collision of the vehicle 1. For example, when the motor MOT does not stop in time until the collision, and the motor MOT is rotating after the collision of the vehicle 1, by locking the rotation of the axle DS by the parking mechanism 60, the rotation of the motor MOT can be stopped more quickly.

Next, the control performed by the clutch control unit 54 after the collision of the vehicle 1 will be described. The control performed by the clutch control unit 54 is executed in place of or in addition to the control performed by the parking mechanism control unit 55.

As shown in FIG. 1, when the second clutch CL2 is engaged, the motor MOT is coupled to the engine ENG via the motor shaft 16, the motor gear train Gm, the counter shaft 17, the high-speed side engine gear train GHi, the engine shaft 13, and the crankshaft 14. When the motor MOT and the engine ENG are coupled after the engine ENG is stopped, even if the motor MOT tries to rotate, the rotation of the motor MOT is suppressed by an engine brake.

Therefore, when the clutch control unit 54 receives the collision signal transmitted from the collision detection unit 73 and recognizes that the collision of the vehicle 1 occurs, the clutch control unit 54 controls the second clutch CL2 to engage, and thus prohibiting the rotation of the motor MOT. That is, the stop state of the motor MOT that is stopped by the motor rotation stop step can be maintained, and thus, it is possible to prevent that the motor MOT rotates and the voltage of the motor MOT becomes high after the collision of the vehicle 1. For example, when the motor MOT does not stop in time until the collision, and the motor MOT is rotating after the collision of the vehicle 1, by coupling the motor MOT and the engine ENG, the rotation of the motor MOT can be stopped more quickly by the engine brake.

Second Embodiment

Figure 8:
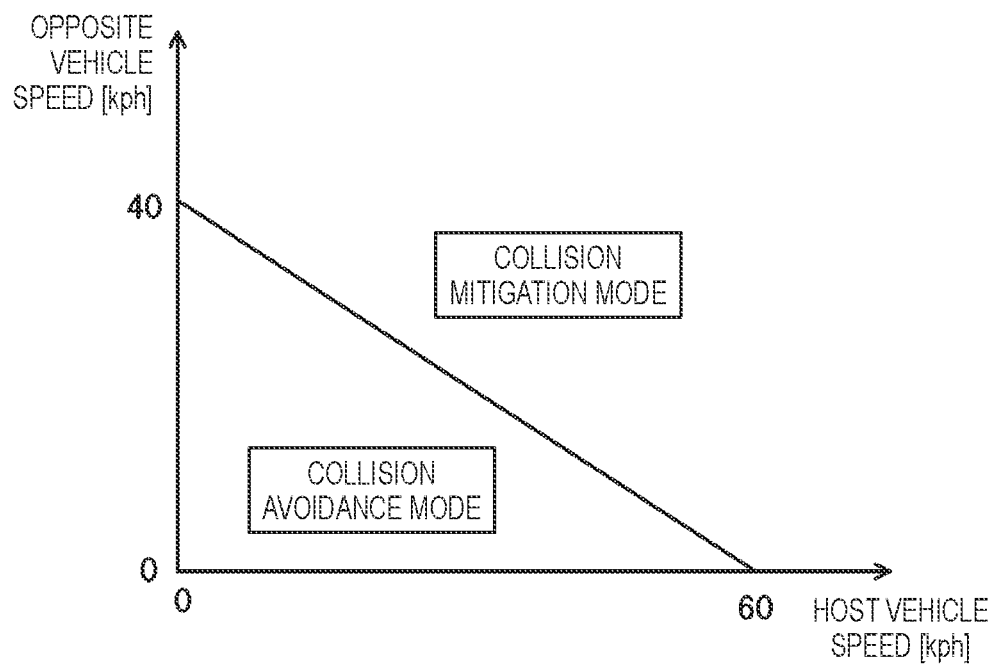
FIG. 8 is a graph showing a region in which a collision avoidance mode is selected and a region in which a collision mitigation mode is selected, which are determined based on a relationship between a host vehicle speed and an opposite vehicle speed.

Next, a second embodiment of the control device for the vehicle of the present invention will be described with reference to FIGS. 8 and 9. Since the configurations of the vehicle 1 and the control device CTR are the same as those of the first embodiment (see FIGS. 1 and 2), descriptions thereof will be omitted.

The second embodiment differs from the first embodiment in that an advanced driver assistance system (ADAS) determines whether to execute the discharge control in an operating state where the ADAS is operating. The ADAS is a driving assistance system represented by an adaptive cruise control system (ACC) and a lane keeping assist system (LKAS).

If there is a possibility of a collision of the vehicle 1, the control device CTR according to the second embodiment selects a collision avoidance mode or a collision mitigation mode, which is part of a function of the ADAS, based on a relationship between the speed of the host vehicle 1 and a speed of a vehicle (also referred to as an opposite vehicle) that may collide with the host vehicle 1 (that is, a relative speed relationship between the host vehicle 1 and the opposite vehicle). Here, the speed of the host vehicle 1 is also referred to as the host vehicle speed, and the speed of the opposite vehicle is also referred to as the opposite vehicle speed. FIG. 8 is a graph showing a region in which the collision avoidance mode is selected and a region in which the collision mitigation mode is selected, which are determined based on the relationship between the host vehicle speed and the opposite vehicle speed. In the example shown in FIG. 8, in a region below a boundary line connecting a point where the host vehicle speed is 60 kph and the opposite vehicle speed is 0 kph and a point where the host vehicle speed is 0 kph and the opposite vehicle speed is 40 kph, the collision avoidance mode is selected, and in a region above the boundary line, the collision mitigation mode is selected.

When the collision avoidance mode is selected, when the collision of the vehicle 1 is predicted, the control device CTR determines that the collision avoidance is possible and that even when the collision occurs, damage to the drive unit 10, the PCU 20, and the like is minimal, and the discharge control is not executed.

When the collision mitigation mode is selected, the control device CTR performs the discharge control when a collision of the vehicle 1 is predicted. More specifically, when the collision mitigation mode is selected, the control device CTR decelerates the vehicle 1 by the brake operation and executes the discharge control.

Figure 9:
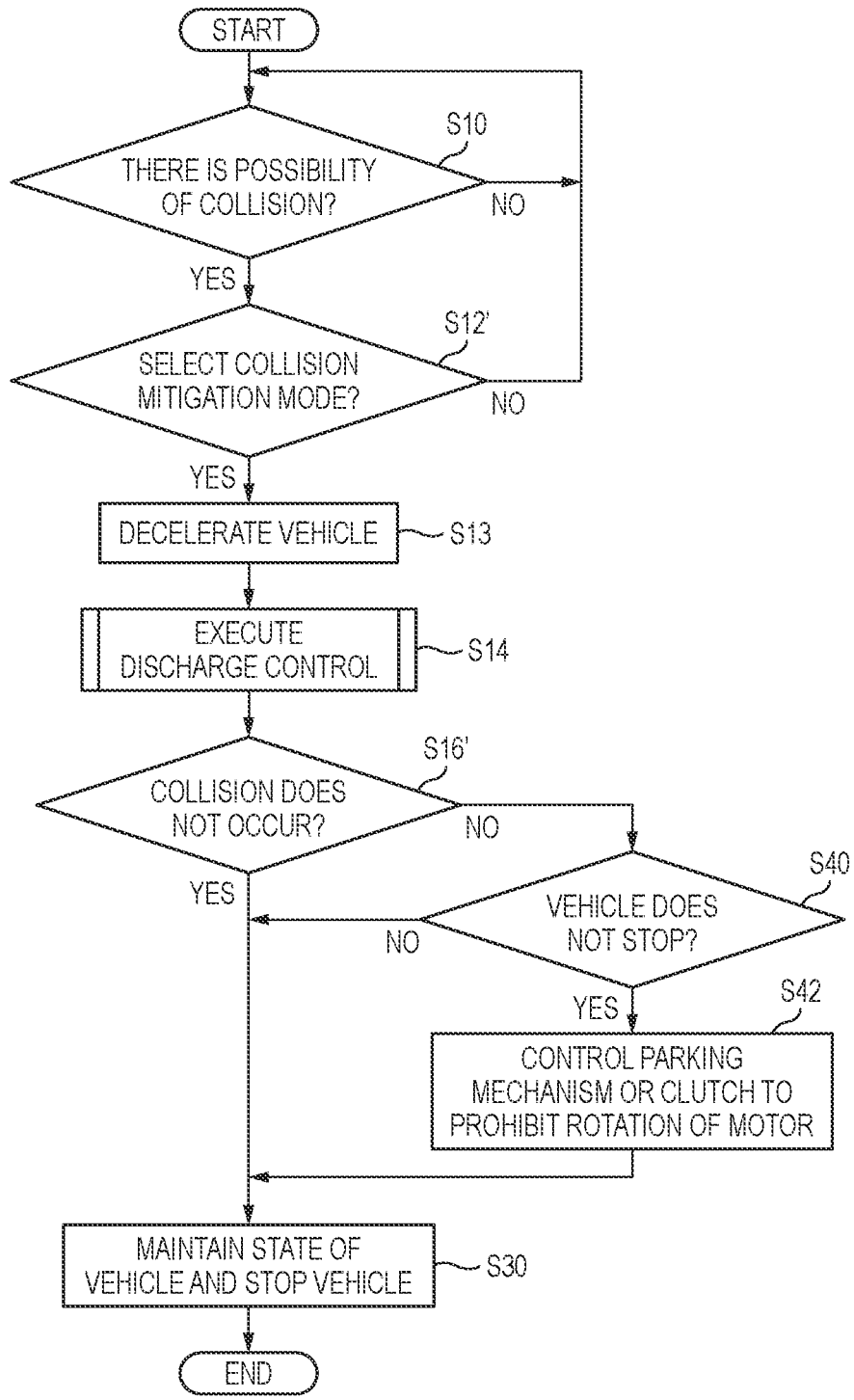
FIG. 9 is a diagram showing an example of a control flow executed by a control device CTR according to a second embodiment when a collision of the vehicle 1 is predicted.

FIG. 9 is an example of a control flow of the second embodiment that is executed when the collision of the vehicle 1 is predicted. The same steps as in the control flow of the first embodiment shown in FIG. 6 are given the same reference numerals.

First, the control device CTR determines whether there is a possibility that the collision of the vehicle 1 occurs (step S10). If there is no possibility that the collision occurs (step S10: NO), the control device CTR monitors step S11 until the possibility of the collision occurs.

If it is determined that there is a possibility that the collision of the vehicle 1 occurs (step S10: YES), the control device CTR determines whether to select the collision mitigation mode based on the information acquired by the external environment recognition unit 71 and/or the vehicle state acquisition unit 72 (step S12'). If the collision mitigation mode is selected (step S12': YES), the control device CTR decelerates the vehicle 1 by the brake operation (step S13) and executes the discharge control (step S14). On the other hand, when the collision mitigation mode is not selected, that is, when the collision avoidance mode is selected (step S12': NO), the control device CTR does not perform the discharge control.

After the collision mitigation mode is selected and the discharge control is executed, the control device CTR determines whether the collision actually does not occur (step S16'). If the collision does not occur (step S16': YES), the control device CTR causes the vehicle 1 to stop while maintaining the current state of the vehicle 1 (step S30). That is, the control device CTR causes the vehicle 1 to stop while continuing the interruption of the battery BAT, the stop of the engine ENG, and the stop of the rotation of the motor MOT, which are executed in the discharge control.

If the collision occurs (step S16': NO), the control device CTR determines whether the vehicle 1 stops (step S40). The second embodiment also differs from the first embodiment in that step S40 is executed after the collision of the vehicle 1 occurs.

If the vehicle 1 does not stop after the collision of the vehicle 1, the power is generated by the motor MOT as the vehicle 1 decelerates even after the collision. In particular, if the generator GEN is damaged by the collision, the generator GEN cannot consume the power generated after the collision. Therefore, if the vehicle does not stop after the collision of the vehicle 1 (step S40: YES), in order to stop the rotation of the motor MOT quickly and reliably, the parking mechanism control unit 55 or the clutch control unit 54 performs the control to prohibit the rotation of the motor MOT (step S42). The control performed by the parking mechanism control unit 55 or the clutch control unit 54 is the same as that described in the first embodiment, and thus, the description is omitted. Accordingly, the electrical safety can be ensured after the collision.

If the vehicle stops after the collision of the vehicle 1 occurs (step S40: NO), the control device CTR executes step S30. That is, the control device CTR continues the interruption of the battery BAT, the stop of the engine ENG, and the stop of the rotation of the motor MOT, which are executed in the discharge control.

Although the embodiments of the present invention have been described above with reference to the accompanying drawings, it is needless to say that the present invention is not limited to the embodiments. It is apparent that those skilled in the art can conceive of various modifications and changes within the scope described in the claims, and it is understood that such modifications and changes naturally fall within the technical scope of the present invention. In addition, respective constituent elements in the above embodiments may be freely combined without departing from the gist of the invention.

In the above-described embodiments, in the discharge control, the power generated by the motor MOT and the electric charges stored in the first capacitor C1 and the second capacitor C2 are supplied to the generator GEN and consumed, but the present invention is not limited thereto. For example, the power and the electric charges may be supplied to an electric compressor (not shown) or the like (constituent elements of an air conditioner) and consumed, or may be supplied to and consumed by a DC-DC converter provided between the battery BAT and a low-voltage battery (not shown) different from the battery BAT.

In the above-described embodiments, the electric charges stored in the first capacitor C1 and the second capacitor C2 are discharged in the capacitor discharge step, but only the electric charge stored in the second capacitor C2 may be discharged.

In the above-described embodiments, the battery interruption step, the engine stop step, and the motor rotation stop step are executed in this order in the discharge control, but the present invention is not limited thereto, and the order may be changed, or these steps may be executed in parallel at the same time.

In the above-described embodiments, the parking mechanism control unit 55 controls the parking mechanism 60 to lock the rotation of the axle DS after the collision of the vehicle 1, but the present invention is not limited thereto. For example, the parking mechanism control unit 55 may control the parking mechanism 60 to lock the rotation of the axle DS when the collision of the vehicle 1 is predicted and the host vehicle speed is 4 kph or less.

In the present specification, at least the following matters are described. In the parentheses, the corresponding constituent elements and the like in the above embodiments are shown as an example, but the present invention is not limited thereto.

(1) A control device (control device CTR) for a vehicle (vehicle 1), in which
the vehicle includes:
an internal combustion engine (engine ENG);
a battery (battery BAT);
a first rotary electric machine (motor MOT) coupled to an axle (axle DS);
a second rotary electric machine (generator GEN) coupled to the internal combustion engine;
a first power conversion circuit (first inverter INV1) configured to convert power between the battery and the first rotary electric machine;
a second power conversion circuit (second inverter INV2) configured to convert power between the battery and the second rotary electric machine and connected in parallel with the first power conversion circuit at connection portions (connection portions 23p, 23n);

a capacitor (first capacitor C1, second capacitor C2) connected between the battery and the connection portions to store an electric charge; and a switching unit (switching unit 30) connected between the battery and the capacitor and configured to interrupt power supply from the battery, the control device is configured to execute discharge control when a collision of the vehicle is predicted, and the discharge control includes:

opening the switching unit to interrupt the power supply from the battery (step S143);

stopping rotation of the first rotary electric machine if the first rotary electric machine is rotating (step S144); and discharging the electric charge stored in the capacitor (step S145).

According to (1), since the power supply from the battery is interrupted when the collision of the vehicle is predicted, it is possible to prevent an excessive short-circuit current from being supplied from the battery after the collision. Since the rotation of the first rotary electric machine is stopped when the collision of the vehicle is predicted, it is possible to prevent that the first rotary electric machine rotates and a voltage thereof becomes high due to a counter electromotive force after the collision. Furthermore, since the electric charge stored in the capacitor is discharged when the collision of the vehicle is predicted, a large number of electric charges will not be discharged from the capacitor after the collision. Electrical safety at the time of the collision can be ensured by the discharge control described above.

(2) The control device for a vehicle according to (1), in which in discharging the electric charge stored in the capacitor, the electric charge is supplied to the second rotary electric machine.

According to (2), since the electric charge stored in the capacitor is supplied to the second rotary electric machine and consumed before the collision, the electrical safety can be ensured after the collision.

(3) The control device for a vehicle according to (1) or (2), in which when the collision of the vehicle is avoided after executing the discharge control, the control device ends the discharge control.

According to (3), when the collision of the vehicle is avoided, the vehicle can be restored to a normal traveling state.

(4) The control device for a vehicle according to any one of (1) to (3), in which the vehicle further includes a parking mechanism (parking mechanism 60) configured to lock rotation of the axle, and upon the collision of the vehicle, the control device controls the parking mechanism to lock the rotation of the axle in order for the first rotary electric machine coupled to the axle not to rotate.

According to (4), after the collision of the vehicle occurs, it is possible to prevent that the first rotary electric machine rotates and a voltage of the first rotary electric machine becomes. For example, when the first rotary electric machine does not stop in time until the collision, and the first rotary electric machine is rotating after the collision of the vehicle, by locking the rotation of the axle by the parking mechanism, the rotation of the first rotary electric machine can be stopped more quickly.

(5) The control device for a vehicle according to any one of (1) to (4), in which the vehicle further includes a clutch configured to couple the first rotary electric machine to the internal combustion engine when the clutch (second clutch CL2) engages, the discharge control further includes stopping the internal combustion engine (step S142), and upon the collision of the vehicle, the control device controls the clutch to engage in order for the first rotary electric machine not to rotate.

According to (5), after the collision of the vehicle occurs, it is possible to prevent that the first rotary electric machine rotates and the voltage of the first rotary electric machine becomes. For example, when the first rotary electric machine does not stop in time until the collision, and the first rotary electric machine is rotating after the collision of the vehicle, by coupling the first rotary electric machine and the internal combustion engine, the rotation of the first rotary electric machine can be more quickly stopped by a braking action of the internal combustion engine.

What is claimed is:

1. A control device for a vehicle, wherein the vehicle includes:
an internal combustion engine;
a battery;
a first rotary electric machine coupled to an axle;
a second rotary electric machine coupled to the internal combustion engine;
a first power conversion circuit configured to convert power between the battery and the first rotary electric machine;
a second power conversion circuit configured to convert power between the battery and the second rotary electric machine and connected in parallel with the first power conversion circuit at connection portions;
a capacitor connected between the battery and the connection portions to store an electric charge; and
a switching unit connected between the battery and the capacitor and configured to interrupt power supply from the battery,
the control device is configured to execute discharge control when a collision of the vehicle is predicted, and
the discharge control includes:
opening the switching unit to interrupt the power supply from the battery;
stopping rotation of the first rotary electric machine if the first rotary electric machine is rotating; and
discharging the electric charge stored in the capacitor.

2. The control device for a vehicle according to claim 1, wherein
in discharging the electric charge stored in the capacitor, the electric charge is supplied to the second rotary electric machine.

3. The control device for a vehicle according to claim 1, wherein
when the collision of the vehicle is avoided after executing the discharge control, the control device ends the discharge control.

4. The control device for a vehicle according to claim 1, wherein
the vehicle further includes a parking mechanism configured to lock rotation of the axle, and
upon the collision of the vehicle, the control device controls the parking mechanism to lock the rotation of the axle in order for the first rotary electric machine coupled to the axle not to rotate.

5. The control device for a vehicle according to claim 1, wherein
- the vehicle further includes a clutch configured to couple the first rotary electric machine to the internal combustion engine when the clutch engages,
- the discharge control further includes stopping the internal combustion engine, and
- upon the collision of the vehicle, the control device controls the clutch to engage in order for the first rotary eclectic machine not to rotate.

* * * * *